United States Patent [19]

Bernd et al.

[11] Patent Number: 4,773,691
[45] Date of Patent: Sep. 27, 1988

[54] ADJUSTABLE WHEEL MOUNT IN CRANE CARRIAGES

[75] Inventors: Alfred Bernd, Herdecke; Salvatore Dimastrogiovanni, Wetter; Harald Bitsch, Witten; Roland Staggl, Wetter, all of Fed. Rep. of Germany

[73] Assignee: Mannesmann AG, Duesseldorf, Fed. Rep. of Germany

[21] Appl. No.: 28,237

[22] Filed: Mar. 20, 1987

[30] Foreign Application Priority Data

Mar. 27, 1986 [DE] Fed. Rep. of Germany ....... 3610426

[51] Int. Cl.⁴ .................. B60B 35/10; B60F 15/00
[52] U.S. Cl. ................... 295/42; 105/163.11; 105/180; 105/218.1
[58] Field of Search ............ 105/157.1, 163.1, 163.2, 105/171, 182.1, 180, 218.1, 223; 212/142.1, 205; 384/583, 519, 495, 558; 295/36.1, 41, 42

[56] References Cited

U.S. PATENT DOCUMENTS 3,796,471 3/1974 Holm .................... 384/558

FOREIGN PATENT DOCUMENTS

| 1137914 | 9/1962 | Fed. Rep. of Germany ...... 384/495 |
| 7712358 | 8/1977 | Fed. Rep. of Germany . |
| 203892 | 11/1983 | Fed. Rep. of Germany ... 105/163.1 |
| 171696 | 6/1960 | Sweden ............... 384/558 |

Primary Examiner—Robert B. Reeves
Assistant Examiner—Frank H. Williams, Jr.
Attorney, Agent, or Firm—Ralf H. Siegemund

[57] ABSTRACT

A crane wheel is adjustably mounted in the web structure of a crane carriage, head carrier, or the like by a bearing holders on each side of the wheel. The bearing holders are individually, pivotably fixed to the web structure by aligned clamping sleeves above axle. Two pendulum-type bearings in the necks of the holders journal the wheel axle. Adjusting screws mounted on the carriage abut cam stops on the bearing holders to adjustably fix the orientation of the wheel axles, including the plane of rotation of the wheel.

5 Claims, 2 Drawing Sheets

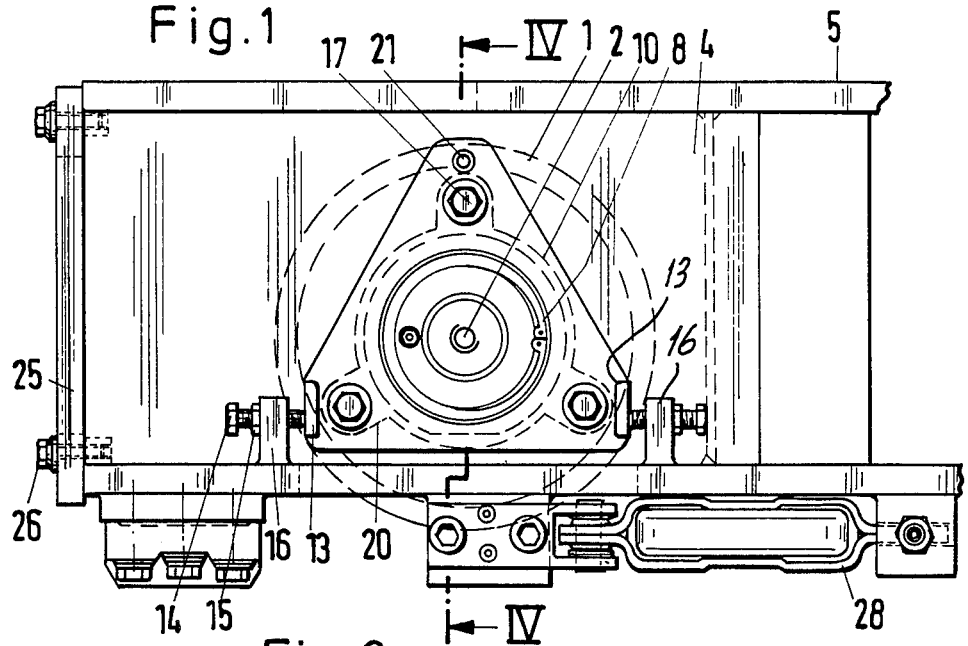
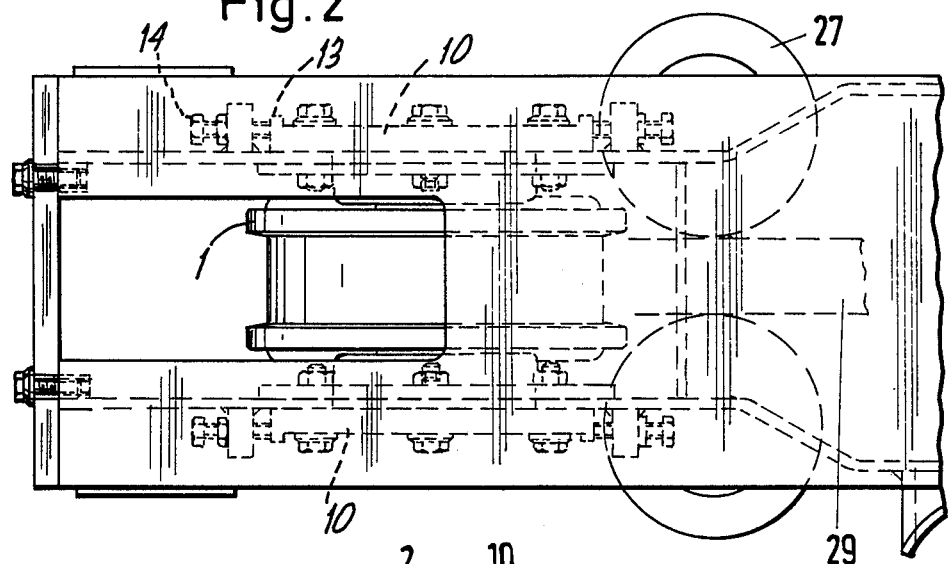
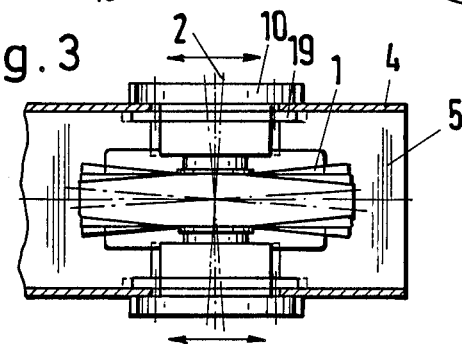

ADJUSTABLE WHEEL MOUNT IN CRANE CARRIAGES

BACKGROUND OF THE INVENTION

The present invention relates to the adjustable mounting of a running wheel for and in a crane, and having an axle mounted in a web structure under utilization of bearings, the web structure pertaining to the movable portion of a crane, carriage, head carrier, or the like.

German petty patent and utility model No. 77 12 358 discloses the mounting of a wheel of the type to which the invention pertains, such that the axle can be adjusted as to elevation and/or parallelism of the axes in relation to the bearings and to the normal on the track or rail on which the wheel runs. A bearing housing is used which has an eccentric bore and will, upon turning cover a full circle. Turning the eccentric bearing housing, however, entails directly a change in elevation, even if only axis orientation or lateral gauge is to be adjusted. Moreover, adjusting the orientation of the axes by turning the eccentric bearing mounts in relation to each other entails an undesired play of the wheel and tilting of the plane of rotation.

DESCRIPTION OF THE INVENTION

It is an object of the present invention to provide a new and improved adjustable mounting of a crane wheel such that the orientation of the axis can be adjusted without noticeable change in elevation, and other misalignment side effects.

In accordance with the preferred embodiment of the present invention, it is suggested to achieve the object in that a pair of bearing holders carry pendulum mounts and are pivotably mounted to a web structure of the wheel carriage above or below the wheel axes, with pivoting to occur in particular aligned points such that the level remains nearly fixed, and that each of the bearing holders on the side opposite to the particular pivot point, is provided with cam stops for engaging adjusting screws which, in turn, are mounted on the wheel carriage structure. Upon pivoting of the bearing holders about the pivot point, on one hand, and through oppositely but equal angles for adjusting the two adjusting screws for the particular holder in cooperation with the cam stops, one can adjust the requisite orientation of the wheel and its axle without entailing any noticeable elevational change of the particular wheel, within the possible adjusting range.

The pivot point is situated above the axle, and is established by means of a clamping or pivot sleeve. Also, in furtherance of the invention, it is suggested, to provide the bearing holders with cam stops below the axes, respectively in the front and in the rear. Adjusting screws with counter nuts are associated with these cams, and screw mounts are arranged at a particular distance from each other. That distance in conjunction with the spacing of the cams determines the range of adjustment of each bearing holder.

The bearing holders, generally, will abut from opposite sides against the web structure of the wheel carriage. The web structures are provided with openings, and necks pertaining to the respective bearing holders project through that opening. The necks support the pendulum bearings. Pressure plates are interposed between the web and the bearing holders and the bearing holders are secured to the web structure by means of screws, once the appropriate pivot position and orientation of the axle has been attained. In order to correct the lateral position of the wheel within the carriage, individual spacer disks are provided which can be placed on one or the other side of the wheel, or both, at equal or unequal numbers, to thereby adjust the lateral position of the wheel in-between the bearing holders.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof will be better understood from the following description taken in connection with the accompanying drawings in which:

FIG. 1 is a side elevation of a crane wheel carriage with wheel mounting structure, in accordance with the preferred embodiment of the present invention for practicing the best mode thereof;

FIG. 2 is a top elevation of the mount and carriage shown in FIG. 1;

FIG. 3 shows a detail of the wheel as mounted and adjusted; and

Figure 4:
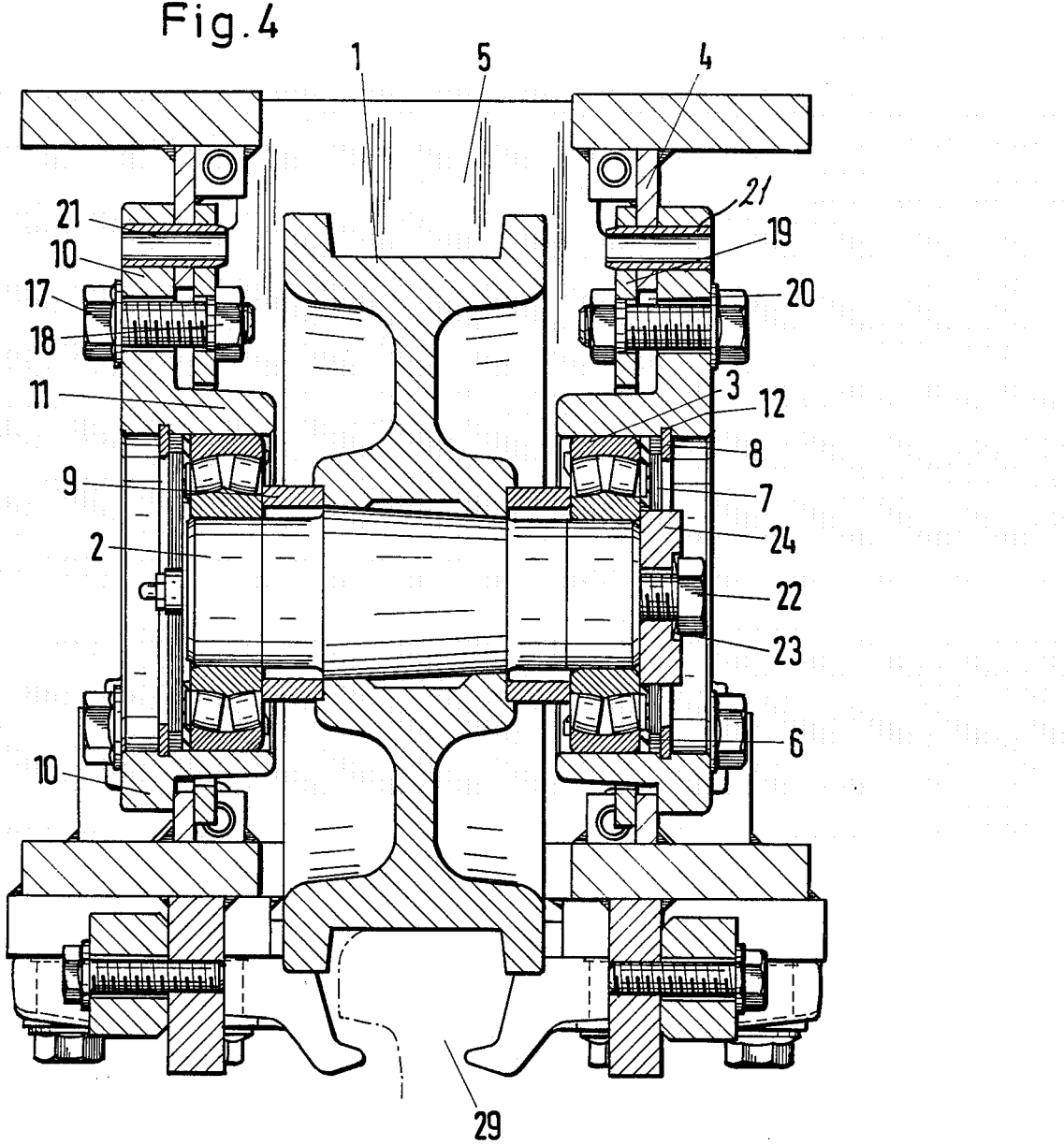
FIG. 4 is a cross-sectional view as indicated by IV—IV in FIG. 1, but on an enlarged scale.

Proceeding now to the detailed description of the drawings, the figures show a wheel 1, pertaining to a crane to run on a suitable rail 29. This wheel 1 has a shaft or axle 2, by means of which the wheel is journaled in pendulum bearings 3 which, in turn, are mounted, to bearing holders 10. These bearing holders 10 are of triangular, plate-like configuration, and are adjustably arranged to both sides of a web structure 4, pertaining to a crane carriage 5. The adjustment is provided for orienting or reorienting the axos of the axle 2. These aspects are shown generally in FIGS. 1, 2, and 3.

Each bearing mount and holder 10 has a neck 11, oriented towards the wheel 1. This neck receives and holds the respective stationary part of bearing 3. The wheel 1 itself bears against the running parts of the bearings 3, there being, however, spacer rings 9 interposed on each side of the wheel. Sealing rings 6 are arranged on the respective outside of the stationary parts of bearings 3. Additional spacer disks 7 are provided between the sealing rings 6 and clamping rings 8, which, in turn, are inserted in annular grooves 12 of the necks 11. The spacer disks 7 will be placed on one side of the wheel, or the other or both in equal or unequal numbers, as is needed, in order to adjust the lateral position of the wheel 1 in the carriage 5.

Each bearing holder 10 is pivotally fixed by means of a clamping or pivot 21 near its apex and above the axle 2 in a particular level, as far as the carriage is concerned. The two sleeves 21 are axially aligned. This feature is particularly shown in FIGS. 1 and 4. In order to align the wheel 1 to the track on which it runs, each holder 10 can be pivoted individually about the clamping or pivot sleeve 21. Each bearing holder 10 is provided with two cam stops 13 in its lower portion, near the other corners of the respective triangle. These cams work as stops for two adjusting screws 14 which are oriented to face each other. The adjusting screws are received by and inserted in screw mounts 16, pertaining to the carrier or carriage 5. The screw mounts 16 are preferably positioned symmetrical to a vertical axis through pivot sleeve 21. The severed screws 14 are secured against undesired turning by means of counter nuts 15.

Following an orienting and aligning of the crane wheel 1 by pivoting the holders 10, they will be urged and forced by means of the cams against screws 14. In addition, the holder plates 10 are urged against the web 4. For this, nuts 18 bear on the inside of the web 4, against a plate 19. The plates cover in parts openings 20 in the web structure 4 for purposes of specifically receiving the bearing holder necks 11, as well as for the three screws 17 by means of which the plates 10 are bolted to the web structure, through the plates 19.

As shown specifically in FIG. 4, the wheel 1 itself is mounted to the axle 2 by means of a conical seat. In order to secure this connection, a threaded bore is provided in the shaft or axle 2, at a narrow end of the truncated cone. This bore receives a clamping screw 22 which urges a clamping plate 24 by means of an annular spring 23 against the running part of one of the bearings 3. The bearings 3, moreover, as stated, bear against the axial ends of the wheel 1 through spacer rings 9.

The front end of carriage 5 is provided with front plate 25, which plate 25 is held thereat by means of screws 26. These screws can be released to remove the plate 25, particularly, when the wheel is to be removed for any reason. Guide rollers 27 are, moreover, held and mounted in the carriage 5 next to the wheel 1 which rollers 27 bear against the rail 29 from opposite sides, and they are held by means of adjustable guide members 28 of the crane carrier 5.

It can readily be seen, particularly from FIG. 3, that on release of the screws 17, the mounting plates and bearing holder 10 can be pivoted about the respective sleeves 21. The pivoting is limited by the adjusting screws 14 which have to be readjusted vis-a-vis the stops 13, whereby the pivot is essentially translated into a longitudinal displacement as indicated by the arrows in FIG. 3. Since the level of the mounting is determined by the invariable level of the pivot point-clamping sleeve 21, and since any commensurate elevational change of the axles 2 is clearly a second order effect, for all practical purposes, the reorienting of the wheel 1 changes its elevation, and particularly the elevation of the axle 2, only to a very insignificant extent. Moreover, the adjustments of bearing holders 10 on both sides of the wheel are, so to speak, opposite but equal, so that even the second order level change that is incurred, is precisely the same on both sides of the axle, avoiding any tilting of the plane of rotation of the wheel.

The invention is not limited to the embodiments described above, but all changes and modifications thereof, not constituting departures from the spirit and scope of the invention, are intended to be included.

We claim:

1. Adjustable mount for a crane wheel in the web structure of a crane carriage, head carrier, or the like, the wheel having an axle comprising:

two bearing holders, respectively to both sides of the wheel, being individually, pivotably fixed to the web structure, pivots being established by means of aligned pivot sleeves in a particular level;

two pendulum-type bearings, respectively, in said holders, for journaling and rotatably mounting said wheel axle, the axle being below said level of the aligned pivot sleeves;

adjusting screws mounted to said carriage and providing for a particular adjusting range; and cam stops on said bearing holders such that upon abutment of these cam stops against the adjusting screws, the position of pivoting of each bearing holder is adjustably fixed to thereby adjust the orientation of the wheel axle, including the plane of rotation of said wheel.

2. Mount as in claim 1, wherein each bearing holder is provided with two cam stops, arranged symmetrically to a vertical line through the respective pivots of the bearing holder, said cam stops being respectively associated with adjusting screws, said adjusting screws being threadedly held in screw mounts, being part of the web and crane structure.

3. Mount as in claim 2, said web structure being of open construction, each of the bearing holders being provided with a neck inserted in said web structure, there being a pressure plate associated with each bearing holder, there being a plurality of screws by means of which the respective bearing holder is forced against the web structure through the respective pressure plate.

4. Mount as in claim 1, including adjustable spacer means for positioning the wheel and its axle in lateral adjustable position in said bearing holders.

5. Mount as in claim 4, said adjustable means including displaceable spacer rings on one or both sides of the wheel.

* * * * *